K. M. DAHL.
MEANS FOR CONNECTING PIPES WITH HEADS, &c.
APPLICATION FILED MAR. 29, 1913.
1,072,208.  Patented Sept. 2, 1913.
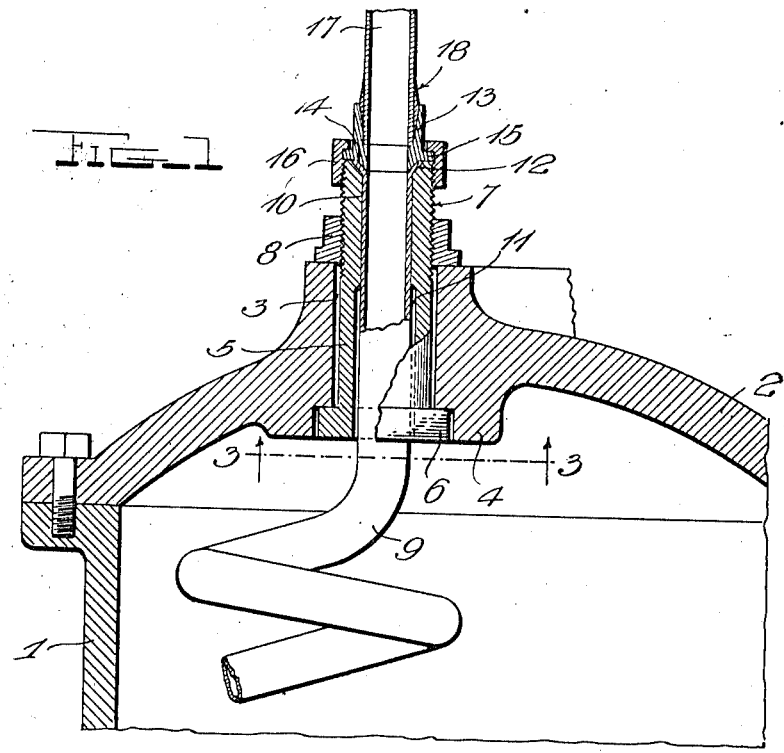
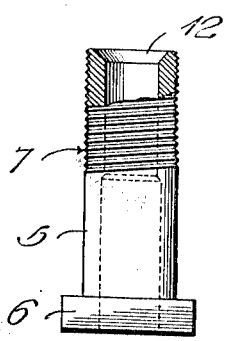
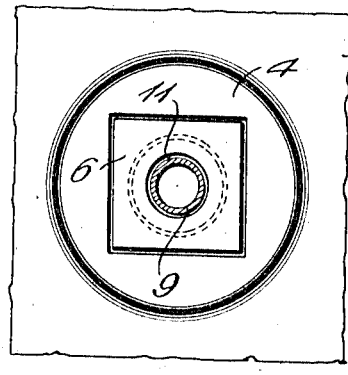
WITNESSES
INVENTOR
Knut Martin Dahl.
By his Attorneys

UNITED STATES PATENT OFFICE.

KNUT MARTIN DAHL, OF SAN FRANCISCO, CALIFORNIA, ASSIGNOR TO UNION IRON WORKS CO., OF SAN FRANCISCO, CALIFORNIA, A CORPORATION OF NEW JERSEY.

MEANS FOR CONNECTING PIPES WITH HEADS, &c.

1,072,208.      Specification of Letters Patent.      Patented Sept. 2, 1913.

Original application filed March 9, 1912, Serial No. 682,695. Divided and this application filed March 29, 1913. Serial No. 757,496.

*To all whom it may concern:*

Be it known that I, KNUT MARTIN DAHL, a citizen of the United States, residing in the city and county of San Francisco, State of California, have invented a new and useful Improvement in Means for Connecting Pipes with Heads, &c., of which the following is a specification.

The subject matter of the present invention is divided from my present application for patent for heater or condenser, filed March 9, 1912, Serial Number 682,695.

The object of the invention is to provide a simple and efficient means for connecting the pipes with the heads or closures of condenser heaters or the like in such manner that the pipes may have the usual contraction and expansion when subjected to heat without causing a leak at the connection and without damaging or distorting the pipes.

With the above object in view the invention consists in providing the head upon its inner side with a boss which surrounds a bore passing through the head. A sleeve passes through the bore and is provided with a flange which fits within the boss in such manner that the sleeve can not rotate when in position. A nut is screw-threaded upon the outer portion of the sleeve and bears against the outer surface of the head whereby the flange is thrown in close contact with the inner surface of the head and a tight joint is effected. The inner portion of the outer end of the sleeve is beveled and a pipe passes through the sleeve and fits snugly in the outer portion thereof. The inner portion of the sleeve is spaced from the pipe in order that the pipe may contract and expand when subjected to heat without damage. A coupling member enters the outer portion of the pipe and spreads the same against the beveled surface of the sleeve, the said coupling member is provided with an exterior flange upon which is located a union nut adapted to engage the thread of the sleeve whereby the parts are securely held together.

For the purpose of illustrating my invention I have shown in the accompanying drawing the form which at present is preferred by me, since the same in practice has been found to give satisfactory and reliable results, although it is to be understood that the various instrumentalities of which my invention consists can be variously arranged and organized and that my invention is not limited to the precise arrangement and organization of these instrumentalities as hereinafter shown and described but may be varied or rearranged in any desired manner falling within the terms of the claim.

In the accompanying drawing:—Figure 1 is a sectional view of a portion of a condenser cylinder and head and the pipe connecting means mounted upon the head. Fig. 2 is a detailed side elevation of the sleeve of the pipe connecting means having parts shown in section. Fig. 3 is a detailed sectional view of the pipe connecting means cut on the line 3—3 of Fig. 1 and viewing the same in the direction indicated by the arrows.

Similar numerals of reference indicate corresponding parts in the figures.

A cylinder 1 is closed at its end by a head 2 of any desired shape or pattern. The head 2 is provided with a bore 3, the inner end of which is surrounded by a boss 4. The bore 3 is cylindrical while the inner walls of the boss 4 are disposed at angles with relation to each other, the object of which will be hereinafter explained. A sleeve 5 passes through the bore 3 and is provided at its inner end with a flange 6 which fits between the inner walls of the boss 4. This flange is approximately rectangular in plan and consequently when it is in position in the boss the sleeve 5 is restrained against rotation. As shown in Fig. 1 the upper surface of the flange 6 bears directly against the end surface of the head 2. The outer portion of the sleeve 5 is externally threaded as at 7 and the nut 8 is screwed upon the said thread and bears at its lower face against the outer surface of the head 2. When the nut 8 is tightened it draws the flange 6 in close contact with the inner surface of the head 2 and consequently no leakage from the cylinder 1 can occur through the bore 3 between the surface of the said bore and the sleeve 5.

A pipe 9 passes through the sleeve 5 and the outer portion of the said pipe fits snugly within the sleeve as indicated at 10. The inner portion of the sleeve 5 is spaced from the pipe 9 as at 11. The outer end of the sleeve 5 is internally beveled as at 12 and the outer end of the pipe 9 is spread against the said bevel. A coupling member 13 is provided with a conical end portion 14 which enters the outer end of the pipe 9 and serves to spread and hold the same against the beveled surface 12 at the outer end of the sleeve 5. The member 13 is provided with a flange 15 upon which is journaled a union nut 16. This nut is adapted to engage the thread 7 of the sleeve 5 and hold the parts in proper contact with relation to each other. One end of a pipe 17 is secured in the member 13 by means of solder 18 or any other equivalent means. By such an arrangement it will be seen that an efficient means is provided for connecting the pipe 17 with the pipe 9, and when connected a liquid or vapor may readily flow through the said pipes. Also an efficient means is provided for securing the pipe 9 with relation to the head 2. Furthermore the pipe 9 may contract and expand when subjected to heat without danger of mutilation for the reason that the said pipe extends well into the sleeve 5 before it fits snugly therein and the space 11 affords ample room for slight lateral vibration or movement on the part of the pipe 9.

It is apparent that I have devised a novel and useful means for connecting the pipes with heads, etc., which embodies the features of advantage enumerated in the statement of the invention, and the above description and while I have in the present instance shown and described the preferred embodiment thereof which has been found in practice to give satisfactory and reliable results, it is to be understood that the same is susceptible of modification in various parts without departing from the spirit or scope of the invention or sacrificing any of the advantages.

Having described the invention what is claimed, is:—

In combination with a receptacle cover having an opening, a sleeve passing through the cover and having at its inner end a flange, said sleeve also having at its opposite end portions bores of different diameter, the inner bore being of greater diameter than the outer bore, a pipe passing through the bores of the sleeve and fitting snugly in the outer smaller bore and spaced from the walls of the inner larger bore, means for fixing the pipe to the sleeve at the outer end thereof, means carried by the cover and engageable with the flange to hold the sleeve against rotation, and means mounted upon the sleeve and engageable with the cover to draw the flange in close contact with the cover to close the opening therein.

KNUT MARTIN DAHL.

Witnesses:
FREDERICK BIRDSALL,
MAURICE ASHER.